(12) United States Patent
Michlik et al.

(10) Patent No.: US 8,590,815 B2
(45) Date of Patent: Nov. 26, 2013

(54) FUEL INJECTOR TIP WITH COMPRESSIVE RESIDUAL STRESS

(75) Inventors: Petr Michlik, East Peoria, IL (US); Ajay Tomar, Chennai (IN); Dennis H. Gibson, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 727 days.

(21) Appl. No.: 12/822,636

(22) Filed: Jun. 24, 2010

(65) Prior Publication Data

US 2011/0315793 A1 Dec. 29, 2011

(51) Int. Cl.
*F02M 61/18* (2006.01)
*F02M 61/16* (2006.01)
*F02M 61/04* (2006.01)
*B21K 1/24* (2006.01)
*B21K 1/20* (2006.01)
*B21K 21/08* (2006.01)
*B21D 53/10* (2006.01)

(52) U.S. Cl.
USPC ............. 239/533.2; 239/602; 239/DIG. 19; 29/421.1; 29/890.122; 29/890.13; 29/890.132; 29/890.143

(58) Field of Classification Search
USPC ............ 239/5, 88–92, 96, 533.2, 533.3, 239/533.8–533.12, 585.1–585.5, 602, 239/DIG. 19; 29/421.1, 890.122, 890.13, 29/890.132, 890.142, 890.143
See application file for complete search history.

(56) References Cited

U.S. PATENT DOCUMENTS

| 4,417,459 A | 11/1983 | Tomita |
| 4,571,969 A | 2/1986 | Tomita |
| 4,819,871 A * | 4/1989 | Kronberger et al. ........ 239/533.3 |
| 6,247,655 B1 * | 6/2001 | Filiz et al. .................. 239/533.2 |
| 7,431,781 B2 | 10/2008 | Usui et al. |
| 2010/0154501 A1 * | 6/2010 | Kampmann et al. .............. 72/54 |

FOREIGN PATENT DOCUMENTS

| DE | 102007047016 | 4/2009 |
| DE | 102008005158 | 7/2009 |
| EP | 1298313 | 2/2003 |

(Continued)

OTHER PUBLICATIONS

Adis Basara PhD, Chapter 4 Evaluation of Fuel Lines Using Speckle Interferometry, 2007, pp. 70-113, Der Technischen Fakultat der Universitat Erlangen-Nurnberg, Germany.

(Continued)

*Primary Examiner* — Darren W Gorman
(74) *Attorney, Agent, or Firm* — Liell & McNeil

(57) ABSTRACT

Steel rod stock is shaped into a fuel injector tip having a central axis and including a shank extending between a mating end and a nozzle end. An inner surface of the fuel injector tip includes a conical needle valve seat and defines a nozzle chamber and a sac on opposite sides of the needle valve seat. The mating end includes a injector stack surface and an injector body contact surface. After shaping the fuel injector tip, it is a case hardened to a hardness in excess of HRC 55. Next, the nozzle end is shaped, after the case hardening step, to include a plurality of nozzle surfaces that each define one of a plurality of nozzle outlets extending between the sac and the outer surface. The inner surface and the nozzle surfaces are then autofrettaged to induce compressive residual stress at the case hardened needle valve seat, the case hardened sac and at least a portion of the nozzle surfaces closest to the sac.

13 Claims, 3 Drawing Sheets

(56) References Cited

FOREIGN PATENT DOCUMENTS

| | | |
|---|---|---|
| JP | 2007231353 | 9/2007 |
| JP | 2009052452 | 3/2009 |
| WO | 2006/089817 | 8/2006 |
| WO | 2008/058494 | 5/2008 |

OTHER PUBLICATIONS

Seung-Kee Koh, Fatigue analysis of autofrettaged pressure vessels with radial holes; International Journal of Fatigue 22 (2000) pp. 717-726, Kunsan, Chonbuk, South Korea.

* cited by examiner

FUEL INJECTOR TIP WITH COMPRESSIVE RESIDUAL STRESS

TECHNICAL FIELD

The present disclosure relates generally to strengthened fuel injector nozzle tips, and more specifically to autofrettaging an already hardened fuel injector tip.

BACKGROUND

Ever more stringent emissions regulations have driven the compression ignition engine industry to adopt increased fuel injection pressures. One area of concern as a consequence of increased injection pressures relates to potential fatigue in the sac region of the fuel injector nozzle tip component. The sac region is often the thinnest pressure containment metallic layer, and also defines the nozzle outlets that extend between an interior volume of the fuel injector to the combustion space of the engine. The sac region will typically cycle through extreme high pressures with each engine cycle.

One strategy believed to have promise in strengthening fuel system components is to induce compressive residual stress on the inner surface the component. While a number of different strategies are possible for inducing compressive residual stress, an autofrettage process can be effective in inducing compressive residual stress on the interior surfaces of pressure vessels. For instance, Chapter 4 from Adis Basara's PhD. dissertation, Evaluation of High Pressure Components of Fuel Injection Systems Using Speckle Interferometry (2007), teaches sealing one end of a fuel line in order to perform an autofrettage process. Thus, an effective autofrettage process for a fuel injector nozzle tip may require that the nozzle outlets be sealed during the autofrettage pressurization procedure. Because the autofrettage pressures are so high, finding a robust production strategy for nozzle tips in a factory setting can be problematic.

Apart from problems associated with creating an effective autofrettage process for an injector tip, are problems associated with integrating the autofrettage process into the other steps associated with making a fuel injector tip. Typically, the raw shape of an injector tip will be made from steel rod stock. The shaping will include creating an inner surface that includes a conical needle valve seat and a sac region, from which the nozzle outlets extend to the outer surface of the tip. Because of the expected repeated impacts at the needle valve seat, it may be case hardened, such as via some known carbonization, carbo-nitraded or other case hardening process. However, case hardening a tip involves metallurgical heat treatment techniques that could tend to destroy compressive residual stress from an autofrettage process. In addition, the sac region of the fuel injector tip often also is in need of being strengthened to provide sufficient fatigue strength, as the sac region will undergo substantial fluid flow forces as well as cyclic pressure changes, and experience the most extreme temperatures of any part of a fuel injector. As a result of the case hardening techniques, the sac, needle valve seat, and other interior surfaces can achieve hardnesses in the range of HRC 55 or greater. However, the conventional wisdom is that such hardened surfaces are inappropriate for autofrettage, as one might expect the autofrettage process to produce microfractures or other problems in the hardened surface. Other strategies for inducing compressive residual stress, such as laser shock pending, could be considered but have their own problems, such as how to access all of the surfaces within the nozzle tip. For instance, the transition from the sac to the surfaces that define the nozzle outlets are a potential area where stress concentrations can occur, leading to fatigue crack development. Thus, the desire to induce compressive residual stress in certain surfaces within the fuel injector tip, may appear by conventional wisdom to be problematic with accepted manufacturing strategies for fuel injector tips.

The present disclosure is directed toward one or more of the problems set forth above.

SUMMARY

In one aspect, a fuel injector tip includes an elongated steel component having a central axis and a shank extending between a mating end and a nozzle end. An inner surface of the fuel injector tip includes a conical needle valve seat and defines a nozzle chamber and a sac on opposite sides of the needle valve seat. The nozzle end includes a plurality of nozzle surfaces that each define one of a plurality of nozzle outlets extending between the sac and an outer surface. The mating end includes an injector stack surface and an injector body contact surface. The inner surface at the needle valve seat, the sac and at least a portion of the nozzle surfaces closest to the sac have compressive residual stress.

In another aspect, steel rod stock is shaped into a fuel injector tip, and then case hardened. The nozzle end of the fuel injector tip is then shaped, after the case hardening step, to include a plurality of nozzle surfaces that each define one of a plurality of nozzle outlets extending between the sac and the outer surface. The inner surface of the fuel injector tip and the nozzle surfaces are autofrettaged, after the nozzle end shaping step, to induce compressive residual stress at the needle valve seat, the sac and at least a portion of the nozzle surfaces closest to the sac.

DETAILED DESCRIPTION

Autofrettage is a means to introduce residual compressive stress to the inside surface of a pressure vessel, and is known to be used in the production of high pressure fuel lines for fuel injection systems. Autofrettaging involves pressurizing the component past the yield strength of the interior material, but below the yield strength for the material closer to the outside surface of the component. The challenge in such a high pressure hydraulic process is sealing effectively. This disclosure teaches blocking the injector nozzle outlets for the autofrettage process. It is proposed that microspheres, slightly larger in diameter than the orifices, be sucked onto the opening of each nozzle outlet. These relatively soft microspheres would then be put under mechanical pressure, and possibly deformed, to block the nozzle outlets during the pressurization of the autofrettage process. As used in this disclosure, the term "block" means that fluid flow past the plug is sufficiently low at autofrettage pressures that the autofrettage process in the sac region of the fuel injector leaves satisfactory levels of compressive residual stress.

Figure 1:
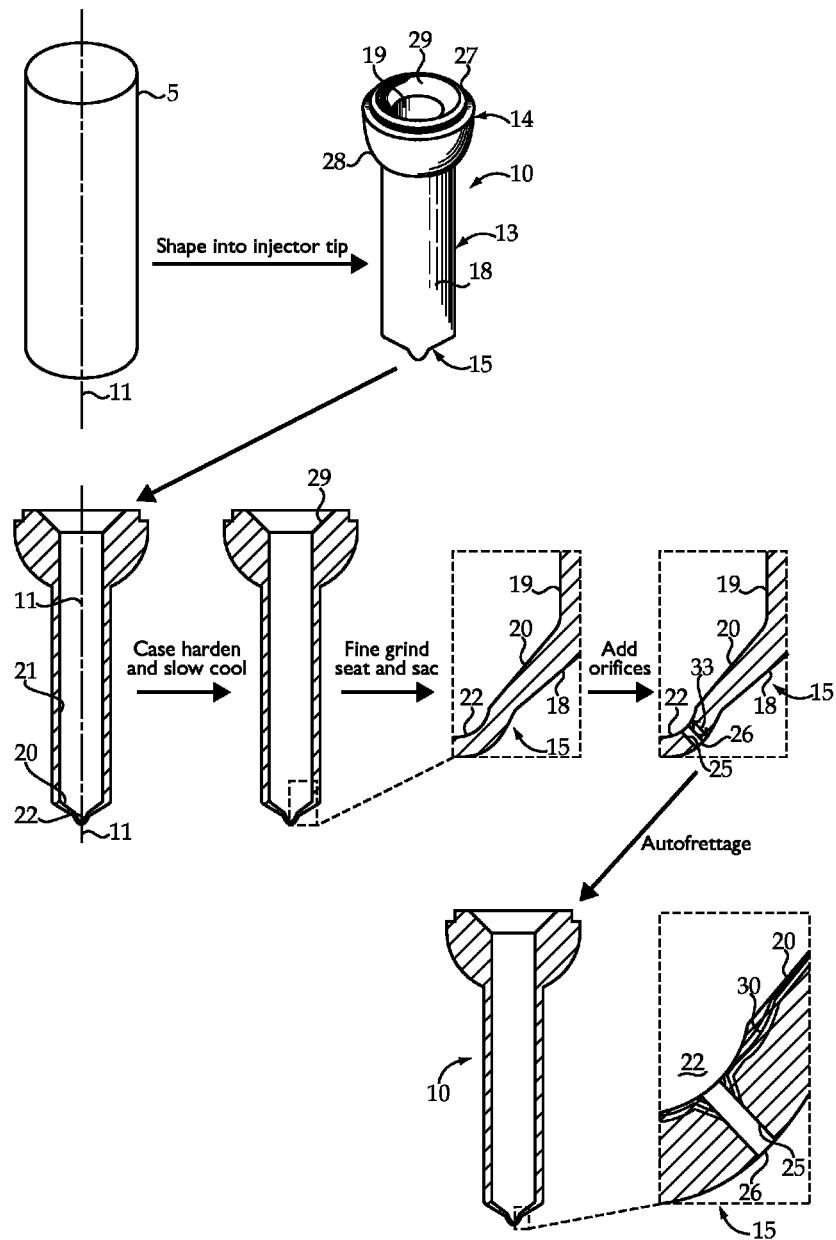
FIG. 1 is a schematic view of a fuel injector tip manufacturing process according to the present disclosure.

A method of making a strengthened fuel injector tip according to the present disclosure includes conventional known techniques for shaping and hardening. Thus, the details regarding these steps need not be taught in detail. A summary is shown in FIG. 1. The process for manufacturing a fuel injector tip may begin with steel rod stock 5 having an appropriate diameter of an appropriate alloy, such as 1E4039 (steel alloy-H10). Steel rod stock 5 is then shaped into a fuel injector tip 10 that includes a central axis 11 and a shank 13 extending between a mating end 14 and a nozzle end 15. After being shaped, the fuel injector tip 10 can be thought of as including an outer surface 18 and an inner surface 19. Inner surface 19 includes a needle valve seat 20, which may have a conical shape, separating a nozzle chamber 21 from a sac 22. The mating end 14 may be shaped to include an injector stack surface 27 that is generally planar and oriented perpendicular to central axis 11, and an injector body contact surface 28 that may be conical or spherical (shown). When the fuel injector tip 10 is included as a portion of a completed fuel injector, an injector casing body component (not shown) contacts injector body contact surface 28. The casing component is mated with another body component to compress a plurality of internal fuel injector components in a stack, such that the component immediately above fuel injector tip 10 is in contact at injector stack surface 27 in a manner well known in the art. The fuel injector tip 10 may also be shaped to include a autofrettage seat 29, that is conical in the illustrated embodiment, but could have any suitable shape for sealing purposes in an autofrettage fixture. It is even possible that the injector stack surface 27 could be utilized as an autofrettage seat provided that sufficient sealing pressure was utilized in an autofrettage fixture.

After the fuel injector tip 10 is shaped, it may undergo a case hardening procedure followed by a slow cool to avoid martensitic transformation. In order to produce a fuel injector tip 10 with an expected superior fatigue life, it may be desirable that the case hardening procedure result in a valve seat and sac with hardness in excess of HRC 55. The case hardening procedure may involve austenitiziton followed thereafter with a carbon bath to infuse carbon in the exposed inner surface 19 and outer surface 18. Nevertheless, those skilled in the art will appreciate that any suitable case hardening technique could be utilized. Although not necessary, it might be desirable thereafter to do some final fine grinding on the needle valve seat 20 and/or sac 22 to get the needle valve seat and the sac to their desired final geometry. Next, the fuel injector tip is shaped to include the nozzle outlets 26 using some accepted technique, such as EDM machining and/or laser drilling, or any other known or to be known technique. The end result is that each of the nozzle outlets 26 is defined by a nozzle surface 25 that extends between sac 22 and outer surface 18.

After forming the nozzle outlets 26, the fuel injector nozzle tip 10 is autofrettaged to induce compressive residual stress 30 on the inner surface 19, especially at the needle valve seat 20 as well as sac 22, the transition therebetween, and at least a portion of the nozzle surfaces 25 that define the individual nozzle outlets 26. In the example, illustrated embodiment, the distance 33 between the sac 22 and outer surface 18 may be less than 1.5 millimeters.

Figure 2:
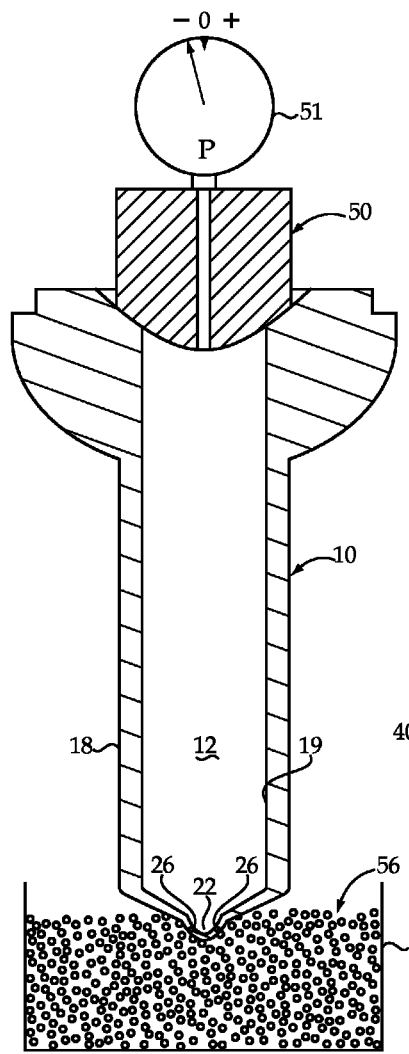
FIG. 2 is a sectioned side view of a nozzle tip with a vacuum applied for suctioning plugs from a vessel.

Referring to FIG. 2, and as stated earlier, fuel injector nozzle tip 10 includes a plurality of nozzle outlets 26 that extend between an interior surface 19 and an exterior surface 18. The interior surface 19 defines an interior volume 12, which includes the sac 22. The fuel injector nozzle tip 10 is shown with an attached vacuum component 50, which may or may not include a pressure gauge 51. For purposes of the present disclosure, the pressure gauge 51 is included to show that the vacuum component 50 is applying a vacuum to the interior volume 12 of nozzle tip 10. While the vacuum is being applied, the nozzle tip 10 may be positioned in a vessel 55 containing a multitude of plugs 56. For purposes of the present disclosure, the phrase "applying a vacuum" means that the pressure in interior volume 12 is lower than the pressure acting on exterior surface 18 in the vicinity of nozzle outlets 26 when the nozzle tip 10 is inserted into the vessel 55 of plugs 56.

Plugs 56 may be suspended and/or immersed in any suitable fluid including air or possibly autofrettage liquid. The volume of plugs may be "fluidized" to mobilize the plugs to facilitate their motion to cover each nozzle outlet. In one embodiment, plugs 56 are non-magnetic stainless steel microspheres having a diameter that is greater than the diameter of nozzle outlets 26, where the outlets open through exterior surface 18. Those skilled in the art will appreciate that the autofrettage process of the present disclosure may occur after case hardening treatment of the fuel injector nozzle tip 10 such that the nozzle outlets 26 open through a convex uncontrolled surface that is a portion of exterior surface 18. Although not necessary, plugs 56 may be made of a material softer than the material of the nozzle tip 10 when undergoing the procedure of the present disclosure. By sizing the microsphere plugs 56 to be greater than the diameter of nozzle outlets 26, the plugs may tend to suction over the nozzle outlets 26 when the vacuum is being applied, rather than being actually drawn into the interior of the nozzle outlets 26. It is believed that sizing the microsphere plugs 26 to have a diameter at least 20% greater than the nozzle outlets 26 but less than two times the diameter of the nozzle outlets at the exterior surface 18 may work suitably well for the procedure of the present disclosure. Those skilled in the art will appreciate that when nozzle tip 10 is being inserted into vessel 55, the nozzle tip 10 may be held and maneuvered in a suitable manner, such as by a production robotic arm, not shown. Thus, when the nozzle tip is inserted into vessel 55, fluid in and around the plugs 56 will cause individual respective plugs to be suctioned over each of the plurality of nozzle outlets 26. Depending upon circumstances, confirming that plugs have been suctioned over each of the nozzle outlets may be accomplished by, for instance, monitoring the flow of fluid into interior volume 12 and confirming that the flow rate must indicate that all of the nozzle outlets are at least partially blocked by a respective plug. Those skilled in the art will appreciate that other alternative confirmation strategies, or none at all, may also be utilized. For instance, by closely monitoring the vacuum pressure within interior volume 12 as the nozzle tip 10 is inserted into vessel 55 one might be able to confirm that all the nozzle outlets are covered.

Figure 3:
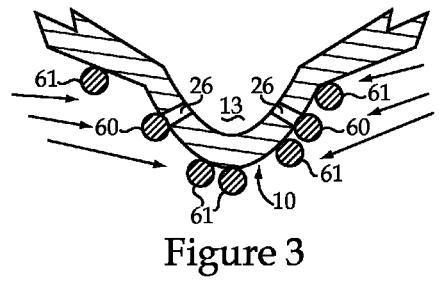
FIG. 3 is an enlarged sectioned side view of the sac area of the nozzle tip of FIG. 2 after the tip has been removed from the vessel of plugs.
Figure 4:
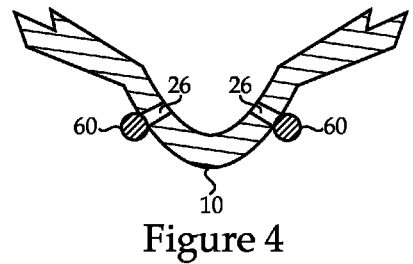
FIG. 4 is a view similar to FIG. 3 after surplus clinging plugs have been removed from the nozzle tip.

After a respective plug 60 has been suctioned over each of the plurality of nozzle outlets 26, the nozzle tip 10 may be removed from the vessel 55 to reveal a close up view as shown in FIG. 3. In particular, one could expect excess plugs 61 to cling to exterior surface 18 at locations away from nozzle outlets 26. Thus, a next step might include a strategy for removing at least some of the excess plugs 61 from the exterior surface 18 so that no excess plugs 61 can interfere with the subsequent portion of the procedure where the nozzle outlets 26 interact with an autofrettage fixture to seal the respective nozzle outlets 26. Thus, some dislodging means 59 may be utilized, which may include blowing air or some other fluid over the outer surface 18 of nozzle tip 10. Alternatively, or in addition, the dislodging means 59 may include some mechanical strategy, such as brushing the exterior surface to remove the excess plugs 61 to leave the nozzle tip 10 as shown in FIG. 4 with only a respective plug 60 suctioned over each of the nozzle outlets 26.

Figure 5:
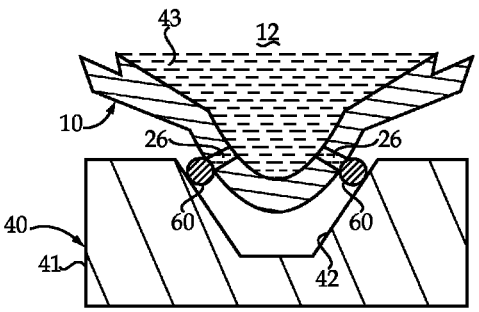
FIG. 5 is a sectioned side view of the nozzle tip of FIG. 4 in contact with an autofrettage fixture for evacuating voids from the interior volume of the nozzle tip.

Although there may be a respective plug suctioned over each nozzle outlet 26, the nozzle outlets may not be sealed. In addition, before pressurization for the autofrettage process commences, voids within interior volume 12 are preferably evacuated. One strategy for evacuating voids may be to maneuver the nozzle tip 10 into proximity of a base 41 of an autofrettage fixture 40 so that the individual plugs 60 are trapped between a contact surface 42 and the individual nozzle outlets 26 as shown in FIG. 5. At this point, if not already done, the interior volume 12 may be filled with autofrettage liquid. Voids within the interior volume may be evacuated by sequentially moving autofrettage liquid from interior volume 12, through each respective nozzle outlet 26 and past each respective plug 60. Alternatively, if the base 41 of autofrettage fixture 40 carries autofrettage liquid, the void evacuation strategy could be reversed such that autofrettage liquid is drawn sequentially past each respective plug 60, through each nozzle outlet 26 and into interior volume 12. In either case, evacuating voids may include moving autofrettage liquid past each respective plug 60 and through the respective nozzle outlet 26. Depending upon the strategy chosen, the vacuum may or may not be relieved on interior volume 12 at this point in the procedure.

Figure 6:
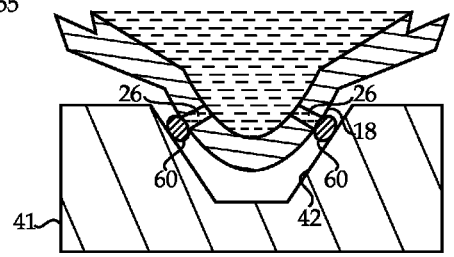
FIG. 6 is a sectioned side view similar to FIG. 5 after the plugs have been crushed to block the nozzle outlets of the nozzle tip.

When there is sufficient confidence that the voids within the interior volume 12 of nozzle tip 10 have been evacuated, the nozzle tip 10 may be fully engaged with the autofrettage fixture 40 by utilizing a clamping force 45 to press each respective plug 60 against the outer surface 18 of nozzle tip 10 at each respective nozzle outlet 26 via contact surface 42. Those skilled in the art will appreciate that the base 41 of autofrettage fixture 40 may include a cup shaped cavity that is defined by contact surface 42. Contact surface 42 may have a contour that closely matches the contours of exterior surface 18 in the vicinity of nozzle outlets 26, or may have a frustoconical shape. Each of the nozzle outlets 26 are blocked, but not necessarily sealed, by pressing the respective plugs against the nozzle outlets. When this is done, the individual plugs 60 may deform and block the nozzle outlets 26 as shown in FIG. 6. Thus, one strategy for blocking the nozzle outlets includes crushing each respective plug between the nozzle tip 10 and an autofrettage fixture component 41.

Figure 7:
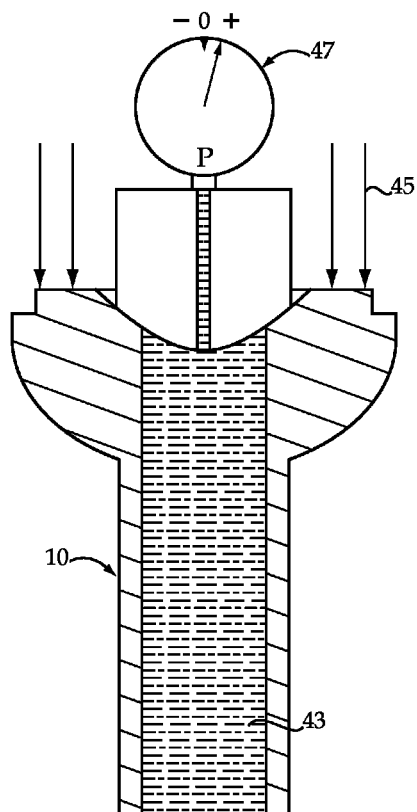
FIG. 7 is a full size view of the nozzle tip during the autofrettage pressurization process.

After the nozzle outlets 26 are blocked and any voids within the interior volume 12 have been evacuated, and after the interior volume is filled with autofrettage liquid, the autofrettage pressurization process is ready to begin. In this case, a hypothetical pressure gauge 47 is included as shown in FIG. 7 to show that the autofrettage liquid 43 is pressurized to an autofrettage pressure level that is chosen based upon a variety of factors, including the material thickness in sac region (e.g. 1.5 millimeters), the material out of which nozzle tip 10 is made, the depth to which the compressive residual stress is desired and many other factors known in the art. The interior volume may remain pressurized to autofrettage pressure levels for a duration that causes plastic deformation of the material in the sac region while only elastic deformation of the material surrounding the sac at the outer surface 18 of nozzle tip 10. In one desired strategy, the fuel injector tip 10 is pressurized to autofrettage pressures, which may be on the order of 1 GPa, and maybe pulsed, and this process is repeated at least two times. Thus, the tip 10 may be pressurized to autofrettage levels, depressurized, and again pressurized to autofrettage levels two or more times without departing from the present disclosure. One of the unexpected results produced by the process of the present disclosure is that even case hardened surfaces in excess of HRC 55 can successfully undergo an autofrettage process to induce compressive residual stress, without substantially changing hardness or otherwise undermining the surface. Although the described autofrettage process includes the use of microspheres, those skilled in the art will appreciate that any procedure for blocking nozzle outlets 26, and then pressurizing the interior 12 of tip 10 to autofrettage pressures would fall within the scope of the present disclosure. The term about 1 GPa means that when the pressure magnitude is rounded to one significant digit, it is equal to 1. Nevertheless, those skilled in the art will appreciate that higher or lower autofrettage pressures may be desired depending upon geometry, materials used and the depth of the desired compressive residual stress.

Figure 8:
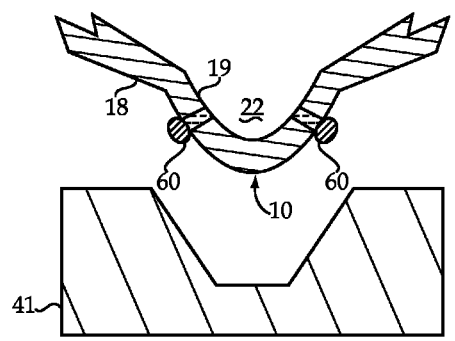
FIG. 8 is an enlarged view of the sac portion of the nozzle tip during removal from the autofrettage fixture of FIG. 7.
Figure 9:
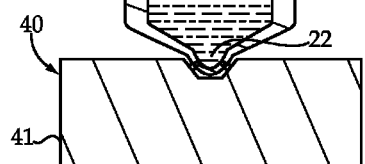
FIG. 9 is a side view similar to that of FIG. 8 showing the plugs being removed from the nozzle tip to complete the nozzle tip strengthening procedure.

Next, the autofrettage pressure is relieved and the nozzle tip 10 is disengaged from base 41 of autofrettage fixture 40 as shown in FIG. 8. The autofrettage liquid may be drained out of nozzle tip 10 by any suitable manner. At this point, the respective plugs 60 may or may not fall free from nozzle tip 10. If required, some dislodging means 59, such as a brush or blowing air may be employed to remove the plugs 60 after the autofrettage process as shown in FIG. 9. If in a production setting, the robotic arm, not shown, might deposit the autofrettaged nozzle tip for subsequent processing and return to retrieve a new nozzle tip 10 for processing as illustrated in FIGS. 2-9.

Although the autofrettage process has been discussed with regard to strengthening the sac region of the nozzle tip 10, similar compressive residual stress may be provided in the cylindrical bore leading to the sac region during the autofrettage process. In other words, plastic deformation may occur in the interior surface 19 in the cylindrical bore portion while only elastic deformation occurs in the region near the exterior surface 18, resulting in compressive residual stress 30 in the interior portion of the nozzle tip 10. Thus the cylindrical bore portion of the nozzle tip may be strengthened in this pressure sensitive region as well. In addition, the deformation during autofrettage can alter defect locations, such as scratches and nicks from tools, making them less susceptible to crack development later.

Industrial Applicability

The present disclosure finds potential application in strengthening a pressure vessel component via an autofrettage process when the component includes at least one outlet. The disclosure is specifically applicable to those pressure vessels in which the component is not modified or otherwise machined to include a seating surface around the nozzle outlet to better facilitate a conventional ball and conical seat sealing strategy. Finally, the present disclosure is specifically applicable to fuel injector nozzle tips in which a plurality of microscopic nozzle outlets are distributed at different locations and are in need of being sealed for an autofrettage process. In addition, the process of the present disclosure may be generally applicable for factory based mass processing of many nozzle tips for strengthening purposes. The present disclosure is specifically applicable to strengthening nozzle tips that must undergo reliable operation at cyclic or continuous high pressures on the order of 240 MPA or higher. Thus, the process of the present disclosure is particularly applicable to blocking uncontrolled convex surfaces through which microscopic holes open, as is typical in the case of a fuel injector nozzle outlet tip 10.

The process of the present disclosure has the advantage of allowing a nozzle tip autofrettage process without requiring extra machining steps or the like to prepare the outer surface of the nozzle tip for sealing in order to undergo the autofrettage pressurization. In addition, the autofrettage process for strengthening the nozzle tip can be added to the conventional method of making a fuel injector tip without altering the prior process in anyway. In other words, the autofrettage process may simply be added as an additional step after the fuel injector tip would have been previously ready for service. While the nozzle outlets could conceivably be blocked by the outer surface of the injector tip being precision ground and then precision tooling being match ground to match the tip precision outer surface, such a strategy would not likely be production robust. The present process may be robust since a relatively blind process can be utilized for plugging and sealing the individual nozzle outlets prior to autofrettage pressurization.

Although the present disclosure contemplates microspheres that are soft relative to the hard material of the nozzle tip, those skilled in the art will appreciate that other shaped plugs are also contemplated. In addition, a lack of spheroidal shapes could be compensated by a more softer plug material. With regard to extra plugs 61 that might adhere to the outer surface of the nozzle tip, those skilled in the art will appreciate that their removal may only be necessary to the extent that they are in a location that could interfere with the engagement between the nozzle tip and the autofrettage fixture in a way that could undermine the sealing ability of the plugs 60 that are at the desired locations over the nozzle outlets 26. In addition, those skilled in the art would appreciate that the brushing or blowing or otherwise removing excess plugs 61 should not be too aggressive so as to possibly dislodge properly positioned plugs 60 that are located covering a nozzle outlet 26. Although the used plugs 60 are shown in the illustrations as being blown or brushed free from the nozzle tip after the autofrettage pressurization, those skilled in the art will appreciate that a pressure differential between the interior volume 12 and the exterior of the nozzle tip 10 could also be exploited to aid in removing the used plugs 60 without departing from the present disclosure.

In addition to improving fatigue strength, especially in the sac 22, plastic deformation during the autofrettage process can desensitive surface defects against future crack formation. Surface defects can include scratches or other deviations from smooth due to tool contact or otherwise. Under a microscope, the sharp edges of the scratch may be softened. In addition, the presence of compressive residual stress may be confirmed by observing deformation in a section plane through the tip.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A fuel injector tip comprising:
    an elongated steel component having a central axis and including a shank extending between a mating end and a nozzle end, and including an outer surface and an inner surface;
    the inner surface including a conical needle valve seat and defining a nozzle chamber and a sac on opposite sides of the needle valve seat;
    the nozzle end including a plurality of nozzle surfaces that each define one of a plurality of nozzle outlets extending between the sac and the outer surface;
    the mating end including an injector stack surface and an injector body contact surface; and
    the inner surface at the needle valve seat, the sac and at least a portion of the nozzle surfaces closest to the sac having compressive residual stress.

2. The fuel injector of claim 1 wherein the inner surface at the needle valve seat and the sac has a hardness in excess of HRC55.

3. The fuel injector tip of claim 2 wherein the mating end includes a conical autofrettage seat.

4. The fuel injector tip of claim 2 wherein a distance between the sac and the outer surface is less than 1.5 millimeters.

5. A method of making a fuel injector tip, comprising the steps of:
    shaping steel rod stock into a fuel injector tip having a central axis and including a shank extending between a mating end and a nozzle end, and including an outer surface and an inner surface; and the inner surface including a conical needle valve seat and defining a nozzle chamber and a sac on opposite sides of the needle valve seat; and the mating end including an injector stack surface and an injector body contact surface;
    case hardening the fuel injector tip;
    shaping the nozzle end, after the case hardening step, to include a plurality of nozzle surfaces that each define one of a plurality of nozzle outlets extending between the sac and the outer surface; and
    autofrettaging the inner surface and the nozzle surfaces, after the nozzle end shaping step, to induce compressive residual stress at the needle valve seat, the sac and at least a portion of the nozzle surfaces closest to the sac.

6. The method of claim 5 wherein the inner surface of the fuel injector tip is hardened in excess of HRC55 from the case hardening step.

7. The method of claim 6 wherein the autofrettaging step includes pressurizing to an autofrettage pressure, depressurizing and again pressurizing to an autofrettage pressure.

8. The method of claim 7 wherein the autofrettage pressure is about one GPa.

9. The method of claim 6 including a step of fine grinding at least one of the sac and the needle valve seat after the case hardening step.

10. The method of claim 6 wherein the steel rod stock shaping step includes separating the sac from the outer surface by less than 1.5 millimeters.

11. The method of claim 10 including a step of fine grinding at least one of the sac and the needle valve seat after the case hardening step;
    the autofrettaging step includes pressurizing to an autofrettage pressure, depressurizing and again pressurizing to an autofrettage pressure.

12. The method of claim 11 wherein the autofrettage pressure is about one GPa.

13. The method of claim 6 wherein the steel rod stock shaping step includes shaping a conical autofrettage seat in the mating end.

* * * * *